United States Patent [19]

Gobeli

[11] 3,882,322

[45] May 6, 1975

[54] PULSE GENERATOR

[75] Inventor: David H. Gobeli, St. Paul, Minn.

[73] Assignee: Medtronic, Inc., Minneapolis, Minn.

[22] Filed: Jan. 26, 1973

[21] Appl. No.: 326,794

[52] U.S. Cl. .................. 307/65; 128/419 P; 307/80; 307/86; 307/106

[51] Int. Cl. .................................................. H02j 7/00

[58] Field of Search ............. 320/30, 48; 331/113 R; 128/419 PS; 307/48, 53, 55, 64, 80, 86, 65, 66

[56] References Cited

UNITED STATES PATENTS

| | | | |
|---|---|---|---|
| 3,293,569 | 12/1966 | Englund, Jr. | 331/113 |
| 3,474,353 | 10/1969 | Keller, Jr. | 331/113 R |
| 3,620,220 | 11/1971 | Murphy, Jr. | 128/419 P |
| 3,738,371 | 6/1973 | Raddi et al. | 128/419 P |
| 3,748,500 | 7/1973 | Tam | 128/419 P |

*Primary Examiner*—David Smith, Jr.
*Attorney, Agent, or Firm*—Lew Schwartz; Wayne A. Sivertson

[57] ABSTRACT

A system for altering the timing characteristics of multiply powered pulse generators in response to a differential power source depletion. The system provides essentially resistive electrical circuitry connected to the pulse generator timing circuitry as well as electrical circuitry for controlling the current flow in the resistive circuitry. The current flow controlling circuitry is responsive to a differential depletion of the power source.

17 Claims, 3 Drawing Figures

PULSE GENERATOR

BACKGROUND OF THE INVENTION

Pulse generator-power source packages have found wide application. Notable among these applications is the implantation of a powered pulse generator for use as a heart pacemaker.

The traditional power source for a heart pacemaker is a chemical type battery having a statistically determinable life expectancy. That is, a power source with a nominal life expectancy of 30 months, for example, might have a 9/10 probability of having an actual life in excess of 24 months, for example. Power source life, life expectancy or failure can be defined in any number of ways including, by way of example, the power requirements of the pulse generator plus a safety factor or the amount of depletion of the power source. The system described herein is amenable to any one of these or any other system of determining life.

Among the systems employed to combat the uncertainties in the life of a pulse generator source, has been to schedule the replacement of the power source or pulse generator-power source package at a time prior to the end of the nominal life expectancy. In a medical context, a probability of power source failure of 10 percent or even 5 percent is obviously unacceptable. For this reason, it has become the practice to additionally provide the pulse generator with multiple power sources.

Prior art multiply powered pulse generators have typically taken two forms. In one, a first power source is employed as a primary power source with the remaining power source or sources being held in reserve as secondary power source(s) until depletion of the primary power source. Others have employed multiple primary power sources each of which is individually sufficient to power the generator. Clearly, either form of multiply powering a pulse generator increases the probability that the pulse generator will remain operational during the nominal life expectancy of the power sources.

Along with the above-described multiply powered pulse generators, there have been developed systems for altering the pulse rate of the pulse generator in response to some forms of depletion of the power sources. In the primary-secondary power source form, the pulse rate is altered upon depletion of the primary power source. The pulse rate alteration in the prior art devices of this type has been on the order of two pulses per minute which is clearly not a readily detectable pulse rate alteration in the heart pacemaker context, for example.

Pulse rate alteration in the multiple primary power source form has been dependent upon the overall power output of the power sources. This form has not heretofore been capable of detecting a differential depletion in one of the power sources so long as one or more of the other power sources has not failed. If the depletion of any one power source with respect to the other power sources in a multiply powered pulse generator (i.e. a differential depletion) could be detected and the pulse rate of the pulse generator altered in response to the differential depletion, it would be possible to defer replacement of the power sources or the power source — pulse generator package until such time as only one of the power sources remained fully operational — a time at which the pulse generator is still fully powered.

SUMMARY OF THE INVENTION

The present invention provides a system for detecting differential power source depletion and for altering the pulse rate of the pulse generator in response to that differential depletion. The system is uniquely adapted to the multiple primary power source form of a multiply powered pulse generator but may also be employed to give a greater alteration in pulse rate than that available in prior art primary-secondary power source forms of multiply powered pulse generator. This is accomplished through the provision of electrical circuitry which is operatively connected to the pulse generator timing circuitry and which is responsive to a differential depletion in the power sources to alter the timing characteristics of the pulse generator timing circuitry.

The many objects, advantages and novel features of the present invention will become apparent from the following detailed description of the invention when considered in conjunction with the accompanying drawings.

DESCRIPTION OF THE PREFERRED EMBODIMENTS

Figure 1:
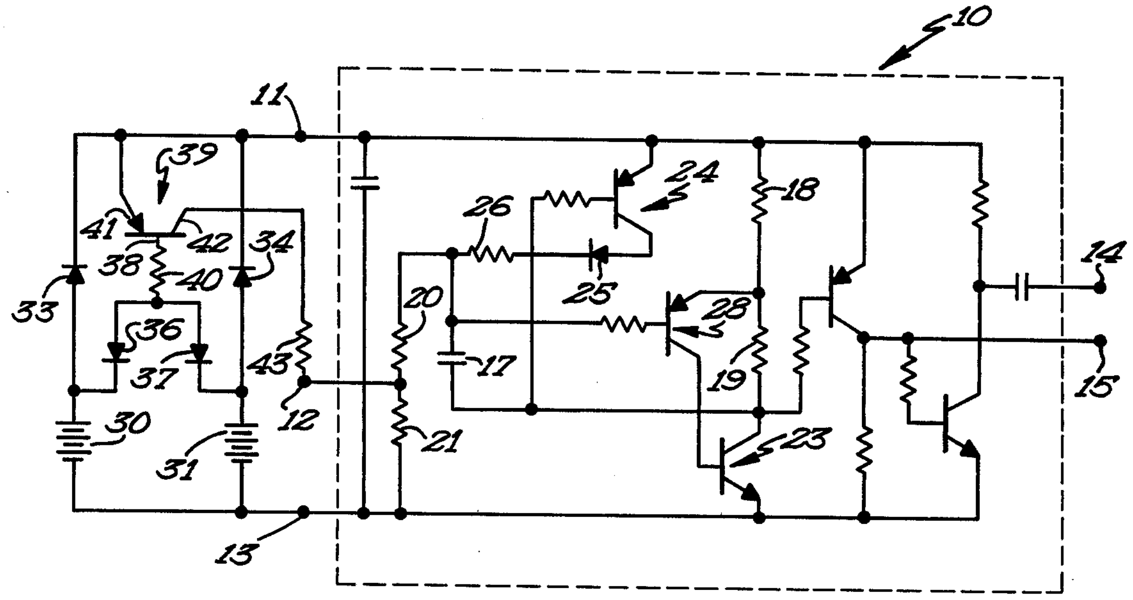
FIG. 1 is a schematic of a preferred embodiment of the present invention in combination with a pulse generator.

FIG. 1 shows a preferred embodiment of the present invention electrically connected to a pulse generator 10. The pulse generator 10 is included by way of explanation only, it being understood that the present invention is not limited to use with this particular circuit and may, in fact, be employed to alter the timing characteristics of any device having timing circuitry.

The pulse generator 10 is fully disclosed in U.S. Pat. No. 3,508,167, of Roger B. Russell, Jr., for Pulse Generator issued Apr. 21, 1970 and will be explained here only to the extent necessary for a full understanding of the present invention. The pulse generator 10 has three power input terminals 11, 12 and 13, and two output terminals 14 and 15. The input terminals 11 and 13 are to be connected across a source of electrical energy while the output terminals 14 and 15 are connected in known manner across a load. The pulse generator 10 has a timing capacitor 17 which is serially connected with the input terminal 11, resistances 18, 19, 20 and 21, and the input terminal 13. In addition, the timing capacitor 17 is also serially connected between the input terminal 11, the emitter-collector junction of a transistor 24, a diode 25, a resistance 26, the collector-emitter junction of a transistor 23, and the input terminal 13. Assuming for the moment that a power source is connected across the input electrodes 11 and 13 with the positive pole of the power source being connected to the electrode 11, the timing capacitor 17 will charge through the resistance 18, 19, 20 and 21. As explained in the U.S. Pat. No. 3,508,167, after the timing capacitor 17 is charged to a certain value, the pulse generator will generate a negative-going pulse during which current will flow from the bottom plate of the capacitor 17, through the emitter-collector circuit of transistor 23, through the power source from the negative to the positive terminal, through the emitter-collector circuit of transistor 24, diode 25, and resistor 26 to the top plate of the capacitor 17. That current causes the capacitor 17 to become charged from positive to negative proceeding from top to bottom plates. Following the negative-going pulse, the pulse generator circuitry will generate a positive-going pulse through the capacitor 17 which will turn off the transistors 23 and 28. With the transistors 23 and 28 turned off, the capacitor 17 discharges and begins to recharge in the opposite direction as current flows from the top plate through the resistors 20 and 21, through the power source from the negative to the positive terminal and through the resistors 18 and 19 to the bottom plate.

From the above, it is apparent that the repetition rate of the particular pulse generating circuitry illustrated is determined by the capacitance of the capacitor 17 and the resistance of resistors 18, 19, 20 and 21, while the pulse width is determined primarily by the resistance of the resistor 26 and the capacitance of the capacitor 17. It is also apparent, that the pulse repetition rate can be altered by operating upon the charging and discharging circuitry of the capacitor 17 without altering the pulse width. That is, that the pulse repetition rate can be changed without affecting the amount of power delivered per pulse.

With this background in mind, we now turn to FIG. 1 wherein a first preferred embodiment of the present invention is illustrated. FIG. 1 shows two power sources 30 and 31 having their negative terminals connected to input terminal 13. The power sources 30 and 31 may be of any known type, it being understood that the type of power source selected will not affect the operation of the present invention. The positive terminals of power sources 30 and 31 are connected to the pulse generator input terminal 11 through generally identical diodes 33 and 34, respectively. A diode 36 is connected between the power source 30 and the diode 33 and a second diode 37 is similarly connected between the power source 31 and the diode 34 to form, with the diode 36, a diode gate. The base electrode 38 of a transistor 39 is electrically connected to a point between the diodes 36 and 37 via a resistor 40. The emitter electrode 41 of the transistor 39 is electrically connected to the power input terminal 11 while its collector electrode 42 is connected to the input terminal 12 via a resistor 43. The input terminal 12 provides an electrical connection intermediate the resistances 20 and 21.

With both the power sources 30 and 31 operating at approximately the same voltage output, the diodes 36 and 37 will prevent a current flow in the resistor 40 thus maintaining the transistor 39 in an "off" condition. This means that the power sources 30 and 31 are essentially connected directly to the input terminals 11 and 13. Through use, it can be expected that both of the power sources will undergo a power depletion and, when the voltage output of either differs enough from the other to allow current to flow through the diode gate, formed by diodes 36 and 37, and the resistor 40, the transistor 39 will turn on and allow current to flow through the resistor 43 to the input terminal 12 and thus to the timing circuitry of the pulse generator 10 thereby changing the pulse timing rate. It is to be understood that it is the differential depletion between the power sources 30 and 31 which causes the transistor 39 to turn on and alter the pulse rate to provide a detectable indication of the differential power source depletion. The amount of alteration in the pulse rate can be established through the selection of the resistor 43. By lowering the resistance of the resistor 43, more current will flow which will provide a greater change in the pulse rate. The particular circuit shown in FIG. 1 will provide a pulse rate slowdown although a pulse rate speed-up can be easily accomplished by altering polarities in the known manner. Further, by changing one or the other of the diodes 33 and 34 or by placing a second diode in series with either of them, the power sources 30 and 31 will be made to operate as a primary and a secondary power source with the pulse rate alteration then being dependent upon a differential depletion of the primary source with respect to the secondary source with the degree of pulse rate alteration being of the same order of magnitude as that attained in the multiple primary power source configuration.

Figure 2:
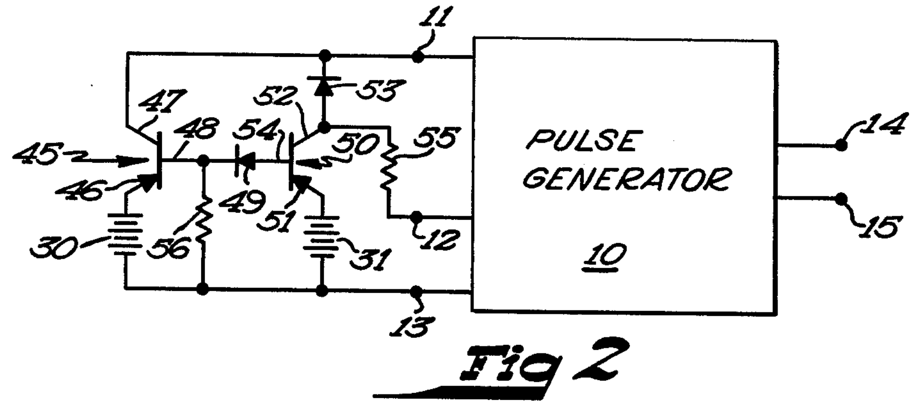
FIG. 2 is a schematic of a second preferred embodiment of the present invention partially in block diagram form.

Referring now to FIG. 2 wherein there is shown a second preferred embodiment of the present invention connected to a pulse generator, here shown in block form at 10, having input terminals 11, 12 and 13, and output terminals 14 and 15. A pair of power sources 30 and 31 are again shown with their negative terminals electrically connected to input terminal 13. A transistor 45 has its emitter electrode 46 connected to the positive terminal of power source 30 and its collector electrode 47 connected to the input terminal 11. A second transistor 50 has its emitter electrode 51 connected to the positive terminal of the power source 31 and its collector electrode 52 connected through a diode 53 to the input terminal 11. The collector electrode 52 of transistor 50 is also connected to the input terminal 12 via a resistor 55. A diode 49 connects the base electrode 54 of the transistor 50 to the base electrode 48 of the transistor 45 and, a resistor 56 connects the base electrode 48 of the transistor 45 and the diode 49 to the input terminal 13.

In the configuration of FIG. 2, the power source 30 acts as a primary power source with the power source 31 held as a secondary source until depletion of the primary source 30. In this embodiment, the secondary source 31 may have identical characteristics to that of the primary source 30 or, in the alternative, the power source 31 may be one which is capable of producing an output voltage essentially equal to that of the primary source 30, but for a shorter period of time. Assuming the initial conditions of an approximate equivalence in voltage across the terminals of the power sources 30 and 31, the transistor 50 will be in the "off" condition and the power source 30 will be providing essentially all of the power to the input terminals 11 and 13. With the transistor 50 off, the resistance 55 will be essentially non-conducting. Through use, the primary power source 30 will begin to deplete with respect to the secondary source 31. When this depletion becomes sufficient to allow a base current flow in the transistor 50, the transistor 50 will begin to turn on. As the transistor 50 turns on, a current will flow through the resistor 55 to the input terminal 12 and thus to the timing circuitry of the pulse generator. This will alter the timing characteristics of the pulse generator in a manner identical to that of the embodiment in FIG. 1 with the amount of alteration as well as the direction of alteration being dependent upon the same conditions.

Figure 3:
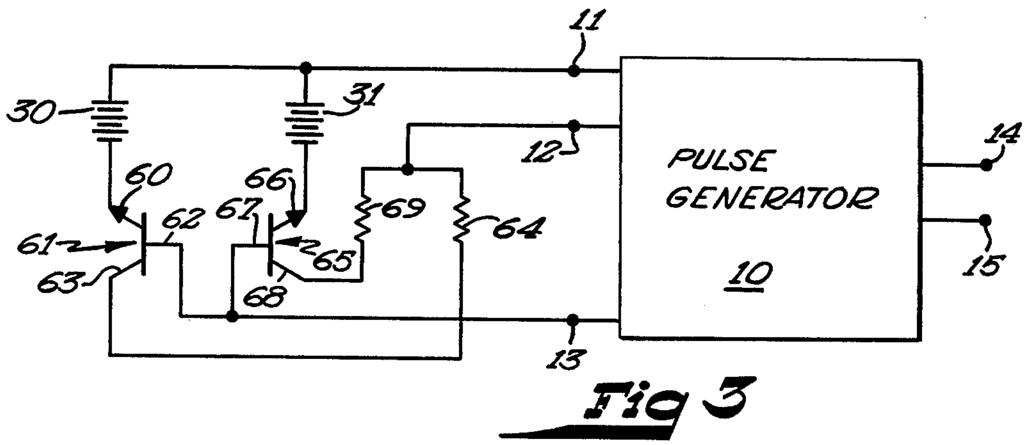
FIG. 3 is a schematic of another preferred embodiment of the present invention partially in block diagram form.

Referring now to FIG. 3 wherein there is shown another preferred embodiment of the present invention electrically connected to pulse generator 10 by way of input terminals 11, 12 and 13. Two power sources 30 and 31 have their positive terminals connected to input terminal 11. The negative terminal of power source 30 is connected to the emitter electrode 60 of a transistor 61. The base electrode 62 of transistor 61 is directly connected to input terminal 13 while the collector electrode 63 is connected to input terminal 12 via a resistor 64. Similarly, a second transistor 65 has its emitter electrode 66 connected to the negative terminal of power source 31, its base electrode 67 directly connected to input terminal 13 and its collector electrode 68 connected to input terminal 12 via a resistor 69. In this embodiment, the timing capacitor 17 charges and discharges through the resistances 18, 19 and 20 (see FIG. 1) and the resistances 64 and 69 through the collector emitter junction of the transistors 61 and 65. The resistance 21 biases the base electrodes 62 and 67. The resistances 64 and 69 differ from each other and both are greater than the resistance 21 to maintain the proper bias on the collector electrodes 63 and 68.

In operation, when the power sources 30 and 31 have a substantially identical power output, both of the transistors 61 and 65 are in the "on" condition and the timing capacitor 17 charges through the internal circuitry of the pulse generator 10 and the external resistances 64 and 69. The negative-going pulse described with reference to FIG. 1, is transmitted from the input terminal 13, through the base emitter junction of the transistors 61 and 65, through the power sources 30 and 31 from the negative to positive terminal and back to the input terminal 11. In this embodiment, the resistive elements 64 and 69 which are connected to the timing circuitry of the pulse generator 10 are normally conducting and therefore are partially determinative of the normal pulse rate of the pulse generator 10. This is contrasted to the embodiments of FIGS. 1 and 2 wherein the resistive element is normally non-conducting therefore having substantially no effect on the pulse generator pulse repetition rate until the occurrence of a differential power source depletion.

With reference again to FIG. 3, as one of the power sources 30 and 31 begins to deplete with respect to the other, its associated transistor switch will begin to turn off as a result of the change in its biasing. As either of the transistors 61 or 65 turns off, its associated resistance, 64 or 69, will undergo a corresponding decrease in current conduction from the pulse generator timing circuit. This will necessarily lead to an alteration in the resistance of the combination of resistors 64 and 69, as seen by the pulse generator timing circuitry, and consequently will alter the resistance in that timing circuitry to alter the pulse rate.

Obviously, many modifications and variations of the present invention are possible in light of the above teachings. One such modification has already been suggested, namely, a polarity reversal whose purpose is to accomplish a pulse rate speed-up as opposed to a slowdown. It is therefore to be understood that within the scope of the appended claims, the invention may be practiced otherwise than as specifically described.

What is claimed is:

1. In a pulse generator of the type having pulse timing means, having a power supply comprising a plurality of power sources connected in parallel and having means connected to each of said power sources for disconnecting any power source from said power supply upon a differential depletion thereof, the improvement which comprises:

resistive means electrically connected to the pulse timing means; and means operatively connected to said resistive means and said power sources for altering the timing characteristics of said pulse timing means by switching the current flow in said resistive means between a conducting state and a non-conducting state in response to a differential depletion of at least one of the power sources with respect to the others.

2. The pulse generator of claim 1 wherein said resistive means is normally non-conducting and said altering means comprises means for causing said resistive means to become conducting only in response to a differential depletion of at least one of the power sources with respect to the others.

3. The pulse generator of claim 2 wherein said power supply is comprised of at least one pair of power sources and said altering means comprises switch means that turns on in response to differential depletion between the paired power sources.

4. The pulse generator of claim 3 wherein said power supply is comprised of one pair of power sources.

5. The pulse generator of claim 2 wherein said power supply comprises at least one primary and at least one secondary power source and said altering means comprises a switch means which turns on in response to a depletion of said primary source.

6. The pulse generator of claim 5 wherein said power supply comprises one primary power source and one secondary power source.

7. The pulse generator of claim 1 wherein said resistive means comprises a plurality of normally conducting resistance means each associated with one of said power sources and said altering means comprises means for changing the conducting characteristics of each of said resistance means only in response to differential depletion of its associated power source with respect to the others.

8. The pulse generator of claim 7 wherein said changing means comprises a plurality of switch means one of which is associated with each of said power sources, said switch means turning off in response to a differential depletion of its associated power source for isolating its associated power source from the others of the power sources.

9. The pulse generator of claim 8 wherein said power supply comprises two power sources.

10. In a pulse generator of the type having pulse timing means, having a power supply comprising at least one set of paired power sources connected in parallel and having means connected to each of said power sources for disconnecting any power source from said power supply upon a differential depletion thereof, the improvement which comprises:

normally non-conducting resistive means electrically connected to the pulse timing means;

a transistor having base, emitter and collector electrodes, the emitter and collector electrodes being connected such that the emitter-collector junction electrically connects the resistive means to at least one of the paired power sources; and asymmetric current conducting means electrically connected intermediate said transistor base electrode and said paired power sources for essentially allowing base current to flow only in the event of a differential depletion between the paired power sources.

11. The pulse generator of claim 10 wherein said asymmetric current conducting means comprises two diodes each connected intermediate said transistor base electrode and a like polarity pole on a different one of said paired power sources.

12. The pulse generator of claim 11 wherein there is one pair of power sources.

13. In a pulse generator of the type having pulse timing means and at least one pair of primary and secondary power sources, the improvement which comprises:

resistive means electrically connected to the pulse timing means:

a transistor having base, emitter, and collector electrodes, the transistor emitter-collector junction electrically connecting the resistive means to a secondary power source;

asymmetric current conducting means electrically connected intermediate a primary power source and said transistor base electrode for allowing transistor base current flow only upon depletion of said primary power source; and means electrically connected to said primary power source for electrically isolating said primary power source from said pulse generator and said secondary power source upon a depletion of said primary power source.

14. The pulse generator of claim 13 wherein there is one primary and one secondary power source.

15. In a pulse generator of the type having pulse timing means, having a power supply comprising a plurality of power sources connected in parallel and having means for disconnecting any power source from said power supply upon a differential depletion thereof, the improvement which comprises:

normally conducting resistive means comprising a plurality of resistance means; and said power source disconnecting means comprising a plurality of transistors having base, emitter and collector electrodes, each of said transistors being associated with a different one of said power sources and a different one of said resistance means and having its emitter-collector junction connected between one of the terminals on its associated power source and its associated resistance means for isolating its associated power source from the other power sources upon a differential depletion thereof, the base electrode of each transistor being connected to a common point.

16. The pulse generator of claim 15 wherein said power supply comprises two power sources.

17. In a pulse generator of the type having pulse timing means and a power supply comprising a plurality of power sources connected in parallel, the improvement which comprises:

a plurality of normally conducting resistance means connected to the pulse timing means; and means interconnecting each of said resistance means to a different one of said power sources for isolating any power source from said pulse generator and the others of said power sources upon a differential depletion thereof.

* * * * *